United States Patent [19]

Metz

[11] 4,399,536
[45] Aug. 16, 1983

[54] CONVOLUTION FILTER ARRANGEMENT FOR DIGITAL MULTIFREQUENCY RECEIVER

[75] Inventor: Reinhard Metz, Oswego, Ill.

[73] Assignee: Bell Telephone Laboratories, Incorporated, Murray Hill, N.J.

[21] Appl. No.: 307,842

[22] Filed: Oct. 2, 1981

[51] Int. Cl.³ .............................................. H04J 3/12
[52] U.S. Cl. .................................. 370/110.3; 364/724; 179/84 VF
[58] Field of Search .................... 370/110.3, 110.1, 50, 370/70, 121, 123; 375/103; 364/724; 179/84 VF

[56] References Cited

U.S. PATENT DOCUMENTS

| | | |
|---|---|---|
| 3,710,028 | 1/1973 | Pitroda . |
| 3,824,471 | 7/1974 | Mills . |
| 3,863,030 | 1/1975 | Mills . |
| 3,872,290 | 3/1975 | Crooke . |
| 3,961,167 | 6/1976 | Mills . |
| 4,048,485 | 9/1977 | Nussbaumer . |
| 4,109,109 | 8/1978 | Molleron ........................ 370/110.3 |
| 4,185,172 | 1/1980 | Melindo et al. ................ 179/84 VF |
| 4,203,008 | 5/1980 | Cohn-Sfetcu et al. ............ 370/110.3 |
| 4,245,325 | 1/1981 | Kikuchi et al. .................... 364/724 |
| 4,328,398 | 5/1982 | Kawaguchi et al. ............... 364/724 |
| 4,354,248 | 10/1982 | Congor et al. ..................... 364/724 |

OTHER PUBLICATIONS

"Digital MF Receiver Technique", *GTE Automatic Electric Journal*, vol. 15, No. 7, May 1977, pp. 317–325, Jeffrey P. Mills, Ph.D.

*Primary Examiner*—Gerald L. Brigance
*Attorney, Agent, or Firm*—F. W. Padden

[57] ABSTRACT

A digital multifrequency (MF) receiver for use in telephone switching systems is disclosed. Input MF signals in a PCM (pulse code modulation) format are detected by simultaneously computing the convolution of the digital input signal with discrete portions of the impulse response of a narrow bandpass filter. The convolution functions are performed by multiplication or log addition circuitry with adder and accumulator apparatus. A 10-millisecond PCM sample comprising 80 discrete samples of an input signal is simultaneously applied to four convolution circuits, each of which applies a different portion of the impulse response of a bandpass filter, also comprising 80 samples, to the input signal as it is received. The complete impulse response signals are applied to the convolution circuits but out-of-phase with impulse response signals as applied to the remainder of the convolution circuits. When four such circuits are used, a quadrature is established and the amplitude of the desired signal is computed at 2.5 millisecond intervals by computing the square root of the sum of the squares of adjacent convolution circuits.

20 Claims, 6 Drawing Figures

NARROW BANDPASS FILTERING PROCESS IN THE FREQUENCY DOMAIN

CONVOLUTION CIRCUITRY

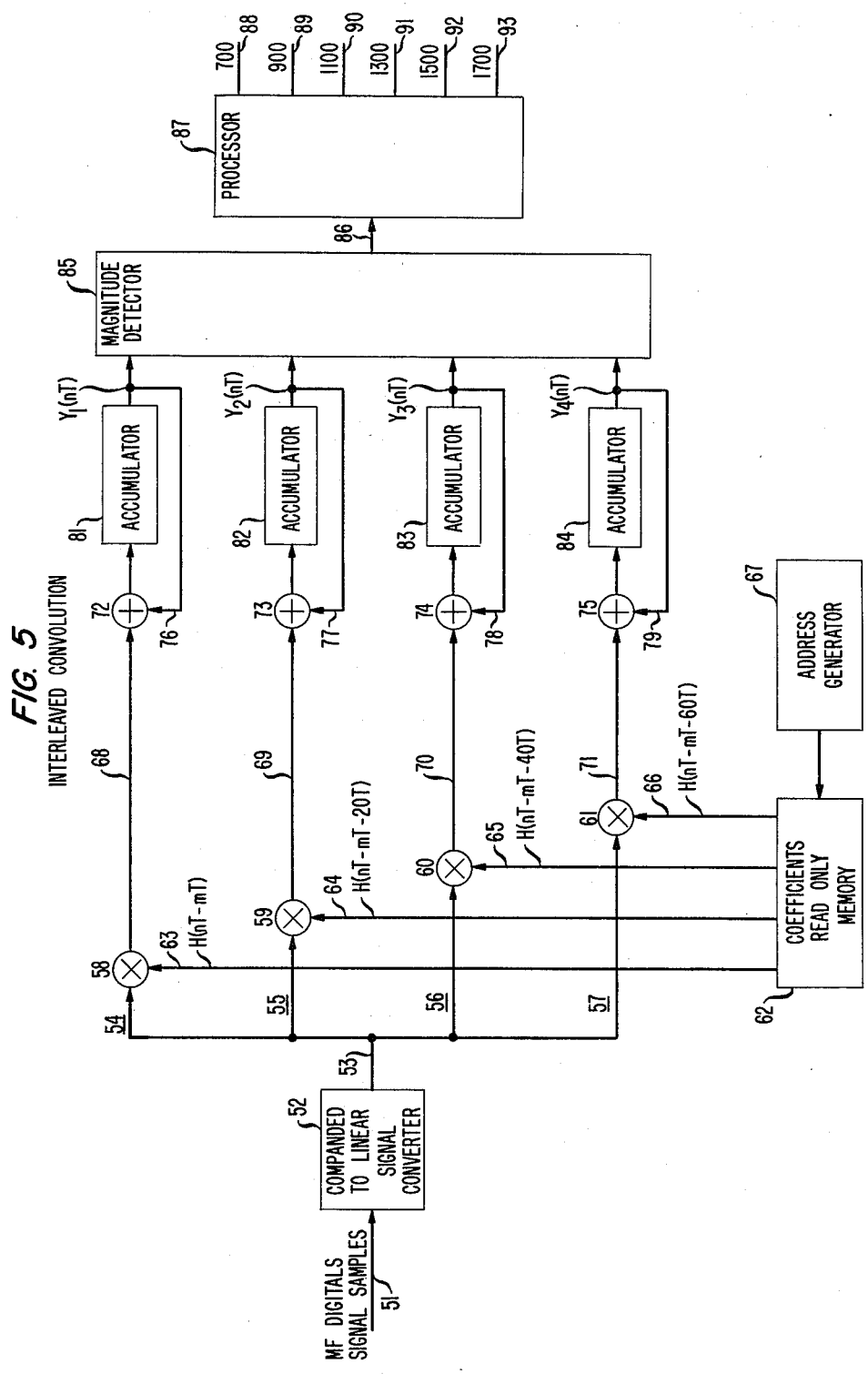

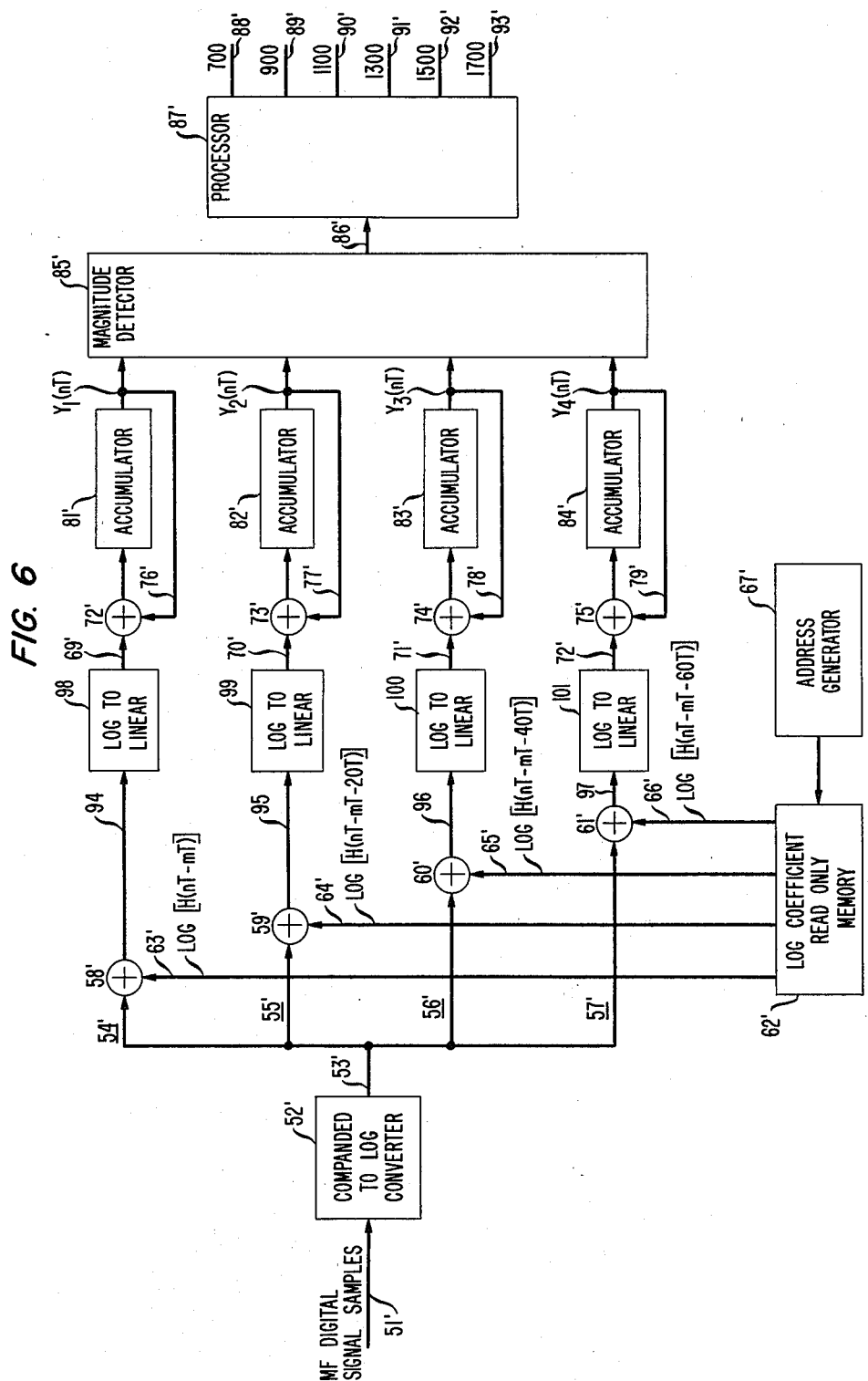

CONVOLUTION FILTER ARRANGEMENT FOR DIGITAL MULTIFREQUENCY RECEIVER

BACKGROUND OF THE INVENTION

This invention relates to digital convolution filters and particularly pertains to a digital signal receiver equipped with multiple simultaneous convolution processing of digital signals representative of sequential samples of an analog tone signal waveform.

Innovations in system design and fabrication techniques for circuit configurations have progressed to the extent that digital transmission for voice and data communication is in widespread use. One such use is in telephone systems where a substantial percentage of interoffice communication is by means of digital facilities. Such transmission enhances the quality, speed and privacy of communication while contributing to the retention of reasonable cost of telephone service. Digital transmission has proven particularly advantageous in switching systems where digital equipment is used for call processing in digital encoded form because the combination eliminates the need for many digital-to-analog and reverse conversions.

While substantial progress has been made in digital communications, a problem yet exists in present day systems where MF (multifrequency) signaling is utilized to convey data and instructions between originating and terminating switching offices in PCM (Pulse Code Modulation) form. The problem arises from the necessity to use complicated and expensive conversion equipments for restoring the digital signal to analog form so that the data and instructions can be interpreted. This technique is undesirable since it requires analog hardware which is bulky, costly and complex and frequently is not otherwise used in a digital switching system.

A need therefore exists in digital systems for facilities to digitally extract the signaling information from the PCM signal, and interpret it without the undesired additional process of first converting the PCM signal to analog.

MF signaling customarily utilizes combinations of any two of six tone signals having frequencies 700, 900, 1100, 1300, 1500 and 1700 Hertz. Each of the resultant signal combinations encoded in PCM format is a complex sequence of binary bits. Whether the MF signal originates in either an analog or a digital office, slight variations in amplitude and oscillator frequency, as well as background voice introduced before the tone signals are encoded into PCM format, can significantly change the sequence of bits. The structure and process used to detect the MF tones coded into these bits must therefore do so without full knowledge of the bits contained in the sequence. Only approximate information is known about the PCM encoded tone signals.

A number of designs for detecting digitally encoded MF tones in PCM systems is known.

U.S. Pat. No. 3,710,028 issued Jan. 9, 1973 to S. G. Pitroda discloses a technique for detecting MF tones in a PCM system based on a determination of the quantity of zero slope counts and peak detector counts for a specific period of time.

U.S. Pat. No. 3,824,471 issued July 16, 1974 to J. P. Mills uses Fourier spectrum analysis for detecting the presence of MF signals. The result of Fourier computations are accumulated and stored in floating point form and a determination is made whether the accumulated amplitude exceeds a certain percentage of that entire signal. The patent discloses an MF receiver employing the Fourier spectrum analysis. The magnitude of the signal is determined by summations of terms of the Fourier series expressed in terms of logs of sine and cosine expressions. The computations of 80 samples are accumulated for yielding an output result once every 10 milliseconds.

Another Mills U.S. Pat. No. 3,961,167 issued June 1, 1976 discloses a PCM tone receiver using statistical techniques. The probability that a certain tone was transmitted is based on a computer analysis of digital input samples and statistical determination that certain tones are present.

U.S. Pat. No. 3,872,290 issued Mar. 18, 1975 to A. W. Crooke discloses a digital filter using convolution of an input signal with a finite impulse function signal. The filter operates at an output sampling rate and partial results of the convolution are stored for a reduced number of required samples. As disclosed in the patent, finite impulse response filters can be realized by a direct application of the convolution equation:

$$Y_j = \sum_{n=0}^{N-1} h_n x_{j-n} \quad j = 0,1,2\ldots; \quad (1)$$

where $h_n$ are the impulse response coefficients of the filter, the $x_j$ represents the successive inputs to the filter, and $y_j$ represent the $j^{th}$ output from the filter.

U.S. Pat. No. 4,048,485 of Sept. 17, 1977 discloses a digital filter which includes a circular convolution device using the complex Mersenne transform to convert a sequence of input signal values into $A_n$ into another sequence $A_k$ in which:

$$A_k \sum_{n=0}^{A_{p-1}} A_n^{Jnk2nk} \quad (2)$$

where P is a prime number and J is the square root of $-1$. The convolution is provided with an input for applying fast length data blocks made up of input samples appended with an equal number of zeros, circuits for recirculating and accumulating the data, a register for storing accumulated data and switches for selectively collecting the output of the storage to the inputs of an adder or subtractor. A product device multiplies term-by-term the output of the adder or subtractor with the complex Mersenne transform of filter coefficient sets appended with zeros and an inverse transform device for performing the inverse complex Mersenne transform in the multiplier output blocks of data.

An object of the present invention is to provide an improved digital convolution method and filter.

SUMMARY OF THE INVENTION

The foregoing object and others are achieved in accordance with an illustrative embodiment of the present invention in which MF signals received in the PCM format are detected by simultaneously computing the convolution of the digital input signal with variably delayed coefficient signals representing discrete portions of the impulse response of a narrow bandpass filter. Illustratively, a 10 millisecond PCM sample comprising 80 discrete samples of an input signal is simultaneously applied to four convolution computation circuits, each of which apply coefficient signals delayed by 20 samples and representing a different portion of the impulse function of a bandpass filter to the input signal as it is received. The complete impulse function is applied at each of the computation circuits but out-of-phase by 20 samples with the impulse function as applied in the remainder of the convolution computation circuits. When four such circuits are used, a quadrature is established and the amplitude of the desired signal is computed at 2.5 millisecond intervals by computing the square root of the sum of the squares of adjacent convolution computation circuits.

The exemplary embodiment is a digital signal receiver for convolution processing of MF PCM digital signals received at a common input. Each digital sample compresses an 8-bit word in a standard PCM format and is derived at a basic sampling rate of 8000 samples per second. A summation period for each convolution is 10 milliseconds or 80 samples. As a practical matter, this is the shortest convenient summation period to yield a desired resolution. This period is longer than desired but is appropriate for constructing a filter to perform reliably in real-time and when subjected to distorted signals which often occur in a functioning communication system. The illustrative receiver comprises a memory device for storing four sets of digital samples representative of the impulse response of an MF bandpass filter. A predetermined time delay period is fixed between each adjacent pair of impulse response samples. This is to achieve interleaved convolution processing by the execution of four convolutions simultaneously each 2.5 milliseconds or 20 samples out-of-phase with the adjacent processes.

Four convolution circuits in the receiver are arranged for simultaneously receiving the input PCM signal samples and interleavingly processing them with the impulse response samples to derive 80 convolution output data samples. Each of the four processes starts and ends 90 degrees out-of-phase with the adjacent convolution processes. In this manner, separate output data signals are generated every 2.5 milliseconds. The MF tones which range from 700 Hertz to 1700 Hertz separated by 200 Hertz each yield between 1.75 and 4.25 cycles separated by 0.5 cycles in every 2.5 millisecond period. By taking one sample every 2.5 milliseconds, the MF tones are "aliased" down to 100 Hertz separated by 0.25 cycle of the alias signal, which constitutes quadrature.

Each of the convolution circuits multiplies the input PCM signal sample with an individual one of the time delayed impulse response samples for generating a set of convolution output data signals which are then stored in an accumulator in the same convolution circuit. A combining circuit compiles the contents of the accumulators to detect the presence of a signal of a frequency defined by the MF bandpass filter. The combining circuit illustratively computes the square root of the sum of the squares of adjacent samples of each of the six MF tones. The presence of tones is ultimately detected by post-processing comparison of the computed magnitudes with a threshold value illustratively taken as $\frac{1}{8}^{th}$ of the sum of all filter outputs.

Resultant advantages of using structure and processes in accordance with the present discovery in a digital telephone transmission system are: equipment economy, power saving, physical space reduction, and easier maintenance as may be gleaned from the following discussion of a well-known D-2 Channel Bank which uses PCM. In a D-2 PCM line arrangement, 8 bits forming a PCM sample are transmitted serially for each of the 24 channels. The 8 bits are converted from serial to parallel and the resultant 8 lines are then multiplexed into one group, which therefore contains 192 bits in 24 channels. Without an MF digital receiver arrangement as is customary in present day systems, 24 different analog receivers are required to serve the 24 channels assuming that all 24 are processing MF signaling on 192 different calls. Advantageously, since a single digital MF receiver utilizing the present invention is fast enough to be time shared among all 24 channels, the single receiver serves a whole group and is connected in the network at a point where the channels are already multiplexed.

BRIEF DESCRIPTION OF THE DRAWING

FIG. 5 is a moving quadrature detection arrangement utilizing four convolution circuits; and FIG. 6 is a log version of the convolution circuits of FIG. 5.

DETAILED DESCRIPTION

Figure 1:
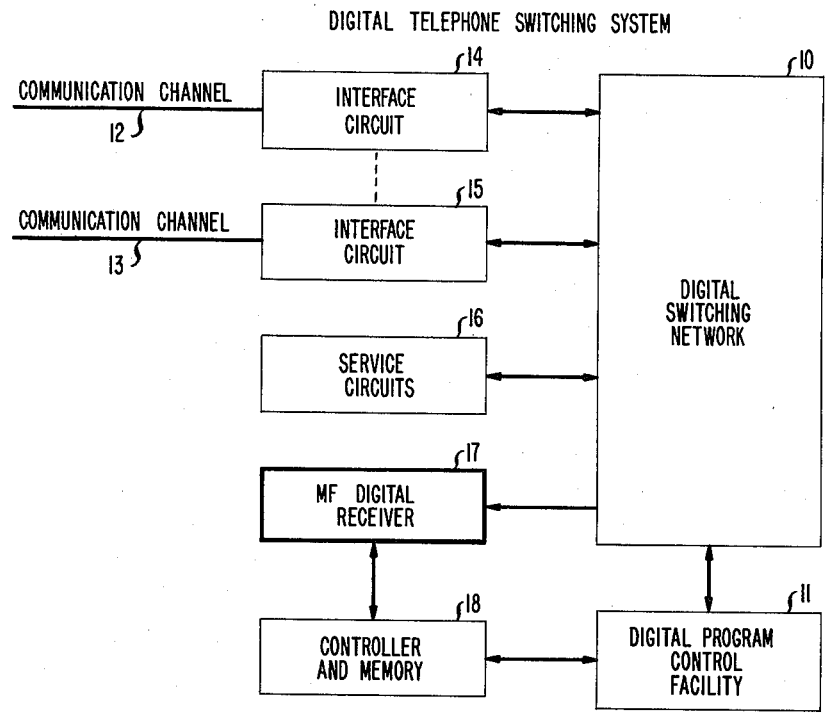
FIG. 1 is a simplified block diagram of a digital telephone switching system utilizing an MF digital receiver embodying the invention and is shown in a heavy-lined block for emphasis.

In the illustrative digital switching system of FIG. 1, a digital switching network 10 operates under control of a program controlled facility 11 and provides for the switching of digitally encoded signals among the communication channels 12 and 13 via terminal interface circuits 14 and 15 and other circuits such as the service circuits 16.

Signaling from a distant telephone office is accomplished over one of communication channels 12 or 13 and is received in the switching system of FIG. 1 via an interface circuit 14 or 15 and the switching network 10 in an MF digital receiver 17. The receiver comprises the exemplary convolution circuitry of this invention. Receiver 17 receives input MF signals illustratively in PCM format and the different MF signals are detected as later explained by the convolution of the digital input signals with variably delayed coefficient signals representing discrete portions of the impulse response of a narrow bandpass filter and supplied by a controller and memory arrangement 18 under control of facility 11. Receiver 17 detects and interprets the received MF signal and supplies them to the facility 11 to complete the call processing operations.

Multifrequency signaling consists of the transmission and reception of two out of a possible six tones, which are 700, 900, 1100, 1300, 1500 and 1700 Hertz. Expressed in another way, an MF tone is of the form $500 + 200i$ Hertz where $i = 1,2,3,4,5$ and 6. For practical applications there are a number of constraints and specifications on the level and duration of the tone pairs. Each pair of tones of the possible 15 combinations indicates a particular number or symbol.

The MF tone detection process thus consists of determining whether there are spectral components at the MF frequencies, and performing subsequent timing and level tests.

Convolution Filtering

Figure 2:
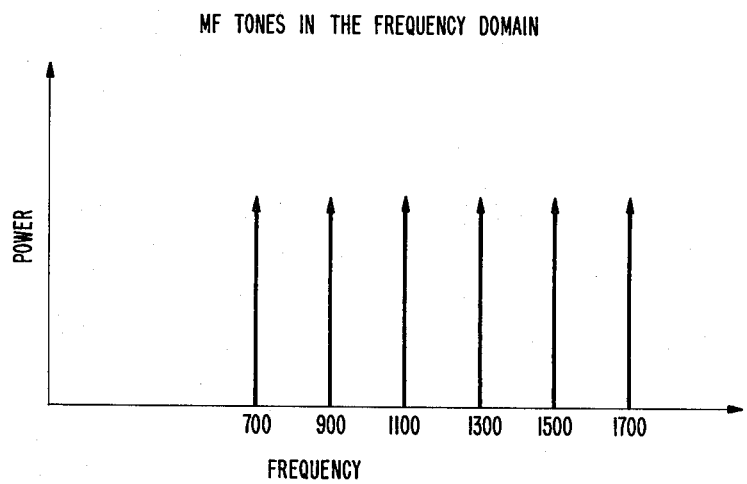
FIG. 2 is the MF tones in the frequency domain.
Figure 3:
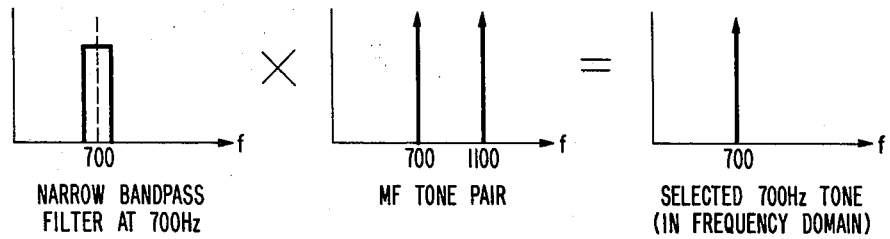
FIG. 3 illustrates a convolution filtering process.

Spectrally, the six MF tones can be thought of as impulses on a frequency axis, as shown in FIG. 2. In practice, a narrow bandpass filter is used at each of the frequencies, such that each filter gives an output if and only if a spectral component is present in its bandpass. This filtering process may be viewed in two ways: The first is that in the frequency domain a narrow, rectangular bandpass multiplies the frequency domain input signal (two impulses plus noise, aberrations, etc. for MF) to yield a selected tone within the frequency domain as illustrated in FIG. 3. The fact remains that in actual practice, the processes occur in a time domain (even if from a mathematical point of view the treatment may be in the frequency domain). Translation between time and frequency domains involves a Fourier transform, and a multiplication in the frequency domain corresponds to a convolution in the time domain. This results in a second view of the filtering process: that is, that the time domain input signal is convolved with the impulse response of a narrow bandpass filter, yielding directly a time domain filtered output signal.

In a continuous system, convolution is expressed as:

$$Y(t) = \int_0^\infty H(t - \lambda) X(t) d\lambda \quad (3)$$

where
Y(t) is the output
X(t) is the input
H(t) is the impulse response of the system.
In a discrete time system, the corresponding form for convolution is:

$$Y(nT) = \sum_{m=0}^{N-1} H(nT - mT) X(mt) \quad (4)$$

where
Y(nT) is the discrete output sequence
X(nT) is the discrete input sequence
H(nT) is the discrete impulse response
NT is the summation interval
T is the sampling interval Accordingly, the integration is replaced by a summation and the summation has a finite length. In practice, the finite length of the convolution determines the bandwidth and stop band attenuation, i.e., the longer the sampling, the more accurate the estimate of the frequency present.

Both X(mT) and H(nT-mT) are finite length discrete sequences, and in this case of real-time continual signal processing, are of equal length. This is called cyclic convolution. X(mT) is directly the input signal sequence. Since H(nT) is the finite length discrete impulse response, H(nt-mT) is merely the impulse response shifted, which due to the cyclic nature of the convolution leads to a wrap-around effect of the impulse response sequence.

Figure 4:
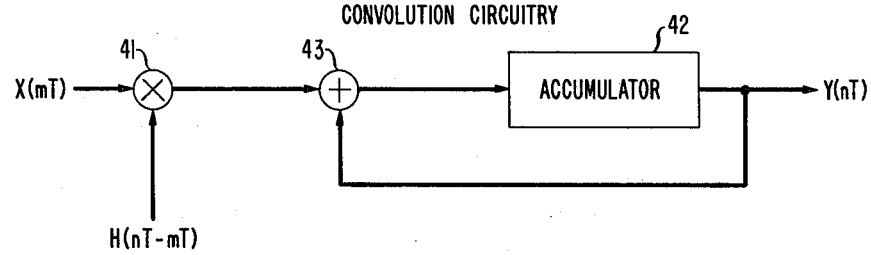
FIG. 4 shows a basic circuit building block for the convolution process.

As shown in FIG. 4, a basic building block for performing the foregoing convolution consists of a multiplication of input signal samples by impulse response samples in multiplier 41, followed by an accumulation of the results over a period of time in accumulator 42 in cooperation with an adder 43. Note that there is a valid output only every N samples, which can be interpreted as follows: Consider a narrow bandpass analog filter with a center frequency $f_0$. Given a continuous input, the filter has a continuous output, with spectral components attenuated (or amplified) according to the bandpass of the filter. The same filter implemented by digital convolution operates "analogously" with the input discrete, and the output in a discrete sampled version of what the analog filter would produce. Since it is the amplitude of the signal that is desired, it must be recovered from the sampled output. A method for estimating signal amplitude is described hereinafter.

MF Filtering

Signaling data in known commercial telephone systems is in an 8-bit, $\mu = 255$ companded form, at a basic sampling rate of 8000 samples per second. A convenient summation period for convolution is 80 samples. This yields an output every 10 milliseconds, and a passband of about 200 Hertz and a stop band attenuation at the adjacent MF frequencies of about 35 dB. This is the shortest convenient summation period (in terms of common divisors with 8000 Hertz) that would satisfy the bandwidth and passband requirements. Accordingly, the convolution takes the form of:

$$Y(nT) = \sum_{m=0}^{79} H(nT - mT) X(mT) \quad (5)$$

which means that during a 10-millisecond period, 80 samples of input signal are multiplied by 80 samples of impulse response, the products being accumulated for yielding an output at the end of the 10-millisecond interval.

Using the foregoing criteria, there are two factors to consider: First, the 10-millisecond interval is too long. That is, the filter will not perform adequately when subjected to midsignal dropouts. The second is the means by which the amplitude of the signal is to be determined from the sample outputs of the convolution. A technical solution to these factors is provided in accordance with the present invention by a moving quadrature detection arrangement as shown in FIG. 5.

Moving Quadrature Detection (FIG. 5)

To provide outputs more frequently than every 10 milliseconds, two or more convolution processes are operated simultaneously and out-of-phase with each other. For example, two processes running 40 samples out-of-phase with each other yield an output every 5 milliseconds. As shown in FIG. 5, four convolutions are run simultaneously with each 20 samples out-of-phase with the adjacent processes. This is achieved by simultaneously operating on the input with four different impulse response samples during each sample period. Note that there are still only 80 impulse response samples and that the process is cyclic, i.e., $$H(nT-mT-80T) = H(nT-mT) \quad (6)$$

It is as if four pointers separated by 20 samples were rotating through a circular stack of 80 impulse response samples. Each Y(nT) produces a valid output every 10 milliseconds and adjacent outputs are separated by 2.5 milliseconds.

FIG. 5 discloses MF digital signal samples in the 8-bit, $\mu=255$ companded form at a basic sampling rate of 8000 samples per second sequentially applied to an input 51 of a companded to linear signal converter 52.

The latter produces a linear digital sample of 12 bits at an output conductor 53 for simultaneous application to four parallel connected convolution circuits 54, 55, 56 and 57. The signal samples on conductor 53 are multiplied in the multipliers 58, 59, 60 and 61 by a respective signal coefficient impulse response sample supplied from a coefficient read only memory 62 over the respective conductors 63, 64, 65 and 66. Memory 62 is sequentially and cyclically addressed under control of an address generator 67 for sequentially reading out each of the coefficient impulse filter response signals defining the convolution filter bandpass at each successive MF frequency 700, 900, 1100, 1300, 1500 and 1700 Hertz.

The four convolutions are run simultaneously through the multipliers 58, 59, 60 and 61 with each 20 samples out-of-phase with the adjacent convolution process. The four out-of-phase sample intervals are defined by 0, -20T, -40T and -60T in the equations H(nT-mT), H(nT-mT-20T), H(nT-mT-40T), H(nT-mT-60T) of FIG. 5. Thus, within a 10-millisecond period 80 samples of the MF input signal are multiplied by 80 samples of impulse response. The four convolution processes simultaneously operate on the MF input signal with four different impulse response samples during each sample period. Again, the four convolution circuits function as if four pointers separated in phase by 20 samples were rotating through a circular stack of 80 impulses response samples.

The products of the multiplications on conductors 68, 69, 70 and 71 are combined in a respective individual adder 72, 73, 74 and 75 with a respective output $Y_1$-$Y_4$ on conductors 76, 77, 78 and 79 of respective individual one of the accumulators 81, 82, 83 and 84. The combined signals at the adder outputs 85, 86, 87 and 88 are entered into respective one of the accumulators 81, 82, 83 and 84. Each of the accumulator outputs $Y_1(nT)$, $Y_2(nT)$, $Y_3(nT)$ and $Y_4(nT)$ is available at a 10-millisecond interval with the $Y_1(nT)$ output out-of-phase with $Y_2(nT)$ by 2.5 milliseconds, $Y_2(nT)$ output out-of-phase with $Y_3(nT)$ by 2.5 milliseconds, $Y_3(nT)$ output out-of-phase with $Y_4(nT)$ by 2.5 milliseconds, and $Y_4(nT)$ output out-of-phase with $Y_1(nT)$ by 2.5 milliseconds.

Since the outputs $Y_1$-$Y_4$ are samples of the filtered signals, these samples are in quadrature because the sampling period is 2.5 milliseconds. This can be rationalized in two ways: First, a 2.5 millisecond sample corresponds to a sampling rate of 400 Hertz, which is below the Nyquist rate for all the MF tones. Recalling that the tones are of the form:

$$500 + 200i \text{ where } i=1,2,3,4,5,6 \quad (7)$$

Thus, the sampling "aliases" any MF tone down to 100 Hertz. The 400 Hertz samples are therefore separated by 0.25 cycle of the alias signal, which constitutes quadrature.

Expressed another way, the number of cycles of a tone which occurs in 2.5 milliseconds is:

$$\begin{aligned}
\text{Number of cycles} &= \frac{\text{cycles}}{\text{second}} \times \text{seconds} \quad (8)\\
&= (500 + 200i) \times .0025\\
&= \frac{500 + 200i}{400}\\
&= 1.25 + .5i \text{ where } i = 1,2,3,4,5,6
\end{aligned}$$

Resultingly, this yields 1.75, 2.25, 2.75, 3.25, 3.75 and 4.25. Adjacent samples are in quadrature although the quadrature is not in the same cycle.

The accumulator outputs $Y_1$-$Y_4$ on conductors 76-79 are furnished to a magnitude detector 85 which checks the amplitude of the signal samples by calculating the square root of the sum of the squares of adjacent samples as follows:

$$Y = [Y_i^2(nT) + Y_{i-1}^2(nT)]^{\frac{1}{2}} \quad (9)$$

Each Y(nT) is used twice and the output exists every 2.5 milliseconds.

It is noted that the quadrature is correct when the input frequencies are exact MF tones, that is, exact odd multiples of 100 Hertz. In commercial telephone applications, the quadrature may be in cycles separated by, for example, four cycles, and the phase error from true quadrature is increased when the signal frequency is offset. Such an error would be greatest for 1700 Hertz. According to an MF receiver requirement, that tone may deviate as much as ±30 cycles. This results in adjacent filter outputs separated by:

$$\begin{aligned}
\frac{1700 \pm 30.5}{400} &= 4.326, 4.174 \quad (10)\\
&\simeq 4.25 \pm .076 \text{ cycles}
\end{aligned}$$

This constitutes a quadrature error from true 90 degrees of +27.4 degrees. The error is maximized when one sample is at 45 degrees and the other is at 135±27.4 degrees.

Inasmuch as such deviations in true quadrature occur, the direct calculation of the square root of the sum of squares is preferably replaced by an arrangement in the apparatus 85 which estimates in accordance with the disclosure and teaching of F. Braun and H. Blaser, "Digital Hardware for Approximating the Amplitude of Quadrature Pairs", *Electronic Letters,* Volume 10, No. 13, pp. 255-256, June 27, 1974. Using a "large plus quarter of the smaller" arrangement, a maximum error due to amplitude estimation and quadrature error is −2 dB. Such an error diminishes, of course, as the frequency deviation decreases and also decreases with the low frequency MF tones.

Upon appropriate amplitude detection of tone signals in apparatus 85, signals are supplied over conductor 86 for postprocessing in a processor 87 which then identifies over conductors 88-93 the appropriate MF tone signals to the system digital program control facility 11 of FIG. 1 for controlling call communication switching operations.

Another embodiment of the invention is an architecture which replaces the multiplication operation with logarithms. The replacement is effective by recalling the relationship:

$$a \times b = \log^{-1}(\log a + \log b) \quad (11)$$

FIG. 6 discloses a four stage log convolution version of the multiplication circuitry of FIG. 5. MF digital signal samples in 8-bit PCM form arrive at an input 51' of a companded to log converter 52', which changes the input digital signal to a log coded signal on conductor 53' for concurrent application to the four log convolution stages 54', 55', 56' and 57'. The conversion illustratively is by a read-only memory table-lookup operation.

Each of the stages 54', 55', 56' and 57' utilizes an individual one of the adders 58', 59', 60' and 61' for combining the log coded signal samples on conductor 53' with respective log encoded impulse response signals repetitively received on conductors 63'-66' from a log coefficient read-only memory 62' under control of the address generator 67'. The adding results occurring on conductors 94'-97' are converted from log to linear in the converters 98'-101'. Illustratively, the conversion involves an 8-bit log to 12-bit linear signal change. The outputs of converters 98'-101' on conductors 68'-71' are thereafter processed through the adders 72'-75', the accumulators 81'-84', magnitude detector 85' and processor 87' for MF tone recognition in essentially the same manner as described for the circuitry of FIG. 5.

What is claimed is:

1. A digital convolution arrangement comprising
means for supplying a plurality of digital impulse response signal samples representative of an impulse response of a bandpass filter, each of said signal samples being delayed by a predetermined time period from each other said signal sample,
a plurality of digital convolution circuits, each of said circuits being responsive to a receipt of input digital signals representative of sequential samples of an analog tone signal waveform and of one of said plurality of digital impulse response signal samples for generating a convolution output data signal, and
means cooperating with said circuits for accumulating each of the generated convolution output data signals.

2. The invention of claim 1 wherein each of said digital convolution circuits comprises
multiplication means responsive to a receipt of the received input digital signals and one of said plurality of digital impulse response signal samples for generating a product convolution output data signal.

3. The invention of claim 2 wherein said accumulating means comprises for each one of said multiplication means
an accumulator for summing each received input sum signal and producing an accumulator output signal, and
an adder for adding product convolution output data signals of said one of said multiplication means and a produced accumulator output signal for providing said input sum signal.

4. The invention of claim 3 wherein said supplying means comprises
memory means storing said plurality of digital impulse response signal samples, and
means for generating signals to address said memory means to effect a concurrent readout of individual impulse response signal samples for each of said plurality of digital convolution circuits.

5. The invention of claim 3 wherein said supplying means comprises
memory means storing said plurality of digital impulse response signal samples, said last-mentioned signal samples comprising plural digital impulse response signal samples for each of a plurality of bandpass frequencies, and
address generator means for generating signals to address said memory means to effect a concurrent supply of plural digital impulse response signal samples to said multiplication means of said digital convolution circuits.

6. The invention of claim 5 further comprising
means responsive to said accumulator output signals for detecting the magnitude of each received tone signal.

7. The invention of claim 6 further comprising
means controlled by said magnitude detecting means for signifying a presence of a tone signal of a frequency defined by each of said digital convolution circuits.

8. The invention of claim 7 wherein
said plurality of digital convolution circuits comprises four digital convolution circuit arrangements and
said supplying means supplies impulse response signal samples to each said circuit arrangement with each of said last-mentioned signal samples delayed by a multiple of twenty signal samples from others of said last-mentioned signal samples.

9. The invention of claim 8 wherein
said address generator means recurrently generates signals to address said memory means to effect a concurrent supply of four individual digital impulse response signal samples to said four convolution circuit arrangements.

10. The invention of claim 9 further comprising
means for converting received companded digital signals representative of sequential signal samples of said analog tone signal waveform into linear digital signals for concurrent application to each of said four convolution circuit arrangements.

11. For use in a digital signal receiver having
input means for receiving digital signals representative of sequential samples of an analog tone signal waveform; the combination comprising
means for supplying a first set of digital impulse response signal samples representative of the impulse response of a bandpass filter and a second set of digital impulse response signal samples representative of the impulse response of said filter and being delayed by a predetermined time period from said first set of impulse response samples;
a first convolution circuit means coupled to said input means and to said supplying means for generating a first set of convolution output data signals in response to a receipt of received digital signal samples and said first set of digital impulse response signal samples;
a second convolution circuit means coupled to said input means and said supplying means for generating a second set of convolution output data signals in response to said received digital signal samples and said second set of digital impulse response signal samples;
means for accumulating output data signals of said first and second convolution circuit means; and
means for processing the accumulated output data signals of said accumulating means to detect a presence of a signal of a frequency defined by said bandpass filter.

12. The invention of claim 11 wherein
each of said first and second convolution circuit means comprises
multiplication means responsive to a receipt of said received digital signals and a respective one of said first and second sets of impulse response signal samples for multiplying said last-mentioned digital signals and impulse response signal samples to produce output product signals.

13. The invention of claim 12 wherein
said accumulating means comprises
a first accumulator means for accumulating output product signals of said multiplication means in said first convolution circuit means, and
a second accumulator means for accumulating output product signals of said multiplication means in said second convolution circuit means.

14. The invention of claim 13 wherein
each of said first and second accumulator means produce an individual output signal for respective accumulated output product signals, and
each of said first and second convolution circuit means comprises means for adding said accumulated output product signals of an individual one of said first and second accumulator means and said output product signals of an individual one of said multiplication means of said first and second convolution circuit means to generate combined output product signals for accumulation in a respective one of said first and second accumulator means.

15. The invention of claim 14 wherein
said processing means comprises means responsive to a receipt of said combined output product signal for detecting the magnitude of the received digital tone signal, and
means controlled by said magnitude detecting means to signify a presence of a tone signal of a frequency defined by said bandpass filter.

16. The invention of claim 15 wherein
said input means comprises
means for converting received companded digital signals representative of sequential samples of said analog tone signal waveform into linear digital signals for concurrent application to said first and second convolution circuit means.

17. The invention of claim 16 wherein said supplying means comprises
memory means storing said first and second sets of impulse response signal samples, and
means for generating signals to address said memory to effect a concurrent readout of said first and second sets of impulse response signal samples.

18. The invention of claim 17 wherein
said memory means comprises a read-only memory means storing impulse response signal samples in said first and second sets for a plurality of tones having different frequencies.

19. The invention of claim 18 wherein
said address generating means recurrently generates signals to address said read-only memory means to effect a concurrent readout of impulse response signal samples of said first and second sets thereof and successively for each of said plurality of said tones having different frequencies.

20. A digital convolution filter arrangement comprising
means for supplying a plurality of digital impulse response signal samples representative of an impulse response of a bandpass filter, each of said signal samples being delayed from each other said signal sample by a multiple of twenty samples,
a plurality of digital convolution circuit devices, each of said devices being responsive to a receipt of input digital signals representative of sequential samples of an analog tone waveform and one of said plurality of digital impulse response samples for generating a convolution output data signal $Y(nT)$ where $$Y(nT) = \sum_{m=0}^{N-1} H(nT - mT) X(mT)$$

where
$Y(nT)$ is a discrete output data signal
$X(nT)$ is a discrete input digital signal
$H(nT)$ is a discrete impulse response signal
$NT$ is a summation interval
$T$ is a sampling interval, and each said device comprises
means responsive to a receipt of the received input digital signals and one of said plurality of digital impulse response signal samples for generating a combined convolution signal,
an adder for adding said combined convolution signal and said convolution output data signal $Y(nT)$ to produce an add output signal, and
an accumulator for accumulating said add output signal to generate said convolution output data signal $Y(nT)$.

* * * * *